US004001647B2

United States Statutory Invention Registration [19]

[11] Reg. Number: H1647

Appleman

[45] Published: May 6, 1997

[54] CYLINDRICAL KEYED COUPLING FOR COMPOSITE PROPULSION SHAFTING

[76] Inventor: William M. Appleman, 2596 Bell Creek Dr., Davidsonville, Md. 21035

[21] Appl. No.: 313,930

[22] Filed: Sep. 28, 1994

[51] Int. Cl.[6] ..... B25G 3/28

[52] U.S. Cl. ..... 403/355

[58] Field of Search ..... 403/11, 41, 185, 403/284, 355, 356, 357, 358; 440/83; 464/32, 81, 82, 83

[56] References Cited

U.S. PATENT DOCUMENTS

| | | | |
|---|---|---|---|
| 633,107 | 9/1899 | Snyder | 403/355 |
| 1,604,423 | 10/1926 | Rosewood | 403/356 |
| 2,332,270 | 10/1943 | Shaw | 403/358 |
| 2,807,485 | 9/1957 | Seibert | 403/356 |
| 3,014,332 | 12/1961 | Hubbard | 403/356 X |
| 3,487,903 | 1/1970 | Stickan | 403/356 X |
| 3,612,582 | 10/1971 | Pitner | 403/290 |
| 3,637,225 | 1/1972 | Schmuck | 279/81 |
| 3,995,968 | 12/1976 | Campbell, Jr. et al. | 403/356 |
| 4,407,602 | 10/1983 | Terry, Jr. | 403/336 |
| 4,722,608 | 2/1988 | Salzman et al. | 366/330 |
| 4,895,351 | 1/1990 | Devand | 403/11 X |
| 5,092,821 | 3/1992 | Gilbert et al. | 464/152 |
| 5,119,995 | 6/1992 | Kohler et al. | 241/261.2 |
| 5,213,001 | 5/1993 | Gruettner et al. | 403/358 X |
| 5,344,252 | 9/1994 | Kakimoto | 403/358 |
| 5,469,958 | 11/1995 | Gruettner et al. | 403/355 X |

FOREIGN PATENT DOCUMENTS

| | | | |
|---|---|---|---|
| 441495 | 5/1912 | France | 403/356 |
| 2652393 | 3/1991 | France | 403/356 |
| 65744 | 10/1972 | Poland | 403/356 |

*Primary Examiner*—Charles T. Jordan
*Assistant Examiner*—Meena Chelliah

[57] ABSTRACT

A coupling for a torsional drive includes a rotatable shaft, an outer surface of which has a keyway comprising a half-round groove. A rotatable hub disposed around the shaft and coaxial with the shaft has an inner surface provided with a second keyway, the second keyway also having a half-round groove. The two keyways are alignable so as to form a cylindrical keyway between the hub and the shaft. A cylindrical key is insertable into the cylindrical keyway between the shaft and the hub to prevent relative rotation therebetween. A plug disposed inside the rotatable shaft prevents radial deformation of the shaft. The material of the hub and the shaft may differ, in which case the material of the key is optimized to reduce stress concentrations and stiffness differentials between the hub and the shaft. The cylindrical key and the cylindrical keyway also may be conically tapered. The formed keyway and key may also be elliptical.

9 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CYLINDRICAL KEYED COUPLING FOR COMPOSITE PROPULSION SHAFTING

This invention was made with Government support by the Naval Surface Warfare Center. The Government has certain rights in this invention.

BACKGROUND OF THE INVENTION

1. Field of the Invention

The invention relates to coupling propulsion shafting to other drive train components and, more specifically, to couplings used in U.S. Navy propulsion systems with components made of composite materials.

2. Description of the Related Art

Propulsion shafts, often made of metal in the past, are today increasingly being made of composite materials. The composite materials may be laminated or filament-wound to form shafts. The shafts connect with motors, engines, generators, etc. to deliver torque to other drive-train components. Components are joined to drive shafts and other drive train components, such as flexible couplings, thrust bearings, gearboxes, prime movers, and propulsors to complete the drive train. Many of the components are often fabricated of metal. Thus, a shaft coupling is a necessary interface between two very distinct shaftline components.

Composite materials typically used in the fabrication of drive train components include polymer-based resin matrix materials, for example thermosetting epoxies and thermoplastic organic polymers, reinforced with a continuous organic fiber, such as continuous carbon fibers or continuous glass fibers. In an exemplary manufacturing process, a layered, filament-wound product is made by winding the organic fiber, saturated with the matrix material, onto a spinning mandrel to create the desired article. The organic fiber reinforces the layered article, with the reinforcement being contained within each layer.

There are only two approved methods for coupling the components of the drive train as currently practiced on U.S. military ships. The first is to provide shafting with flanges forged integrally. At the present time, however, it is not practical to filament wind a composite flange capable of handling ship propulsion loads. The second method is to utilize square keys and keyways to transfer the torsional load, a system which poses particular problems, especially with respect to propulsion systems combining composite and metal component materials.

The primary load for a Navy propulsion shaft is torsion. Composite structures, which are anisotropic materials, can be quite intolerant of high stress concentrations such as can occur in the vicinity of holes, fillets, notches, and grooves. U.S. Navy propulsion shafting must be capable of handling high torsional loads, extended bending-fatigue life in a seawater environment, and moderate axial loads to push or pull a vessel through the water.

Work in the application of composite propulsion shafting, conducted at the Naval Surface Warfare Center in Annapolis, has resulted in successful demonstrations of composite materials to carry the loads necessary. Filament wound composite tubes have been designed and fabricated to carry all of the above-mentioned combined propulsion loads. The most challenging work involves the design and demonstration of composite joining techniques capable of transferring the primary propulsion loads between the composite shafting and other shaft-line components.

Due to their anisotropic nature, fiber-reinforced composites can exhibit stress concentrations as high as 9. (Stress concentrations are unitless factors which are applied to "local" regions of a structure. The "local" regions exhibit an abrupt change in geometry, material or both. Instead of performing a detailed stress analysis for each "local" region, the "average" stress of the structure is multiplied by the stress concentration to give an approximate stress for the "local" region). Typical stress concentrations for isotropic materials range from 2 to 3. These stress concentrations result from holes, cut-outs or other dramatic changes in structural geometry.

Shafting generally exhibits a constant geometry along its length until a coupling is employed to couple powertrain components or additional shaft sections together. For example, current practice utilizes a steel shaft coupled to a bronze propulsor. Couplings are always accompanied by stress concentrations, whether it is due to a change in geometry or a change in materials. The problem is magnified with composite materials, due primarily to the extreme stress concentrations associated with these highly anisotropic materials.

Couplings have been standardized for conventional, forged steel, Navy propulsion shafting. Standard, metallic keyed couplings, use square keys and keyways mounted along the axis of the shaft. An example of a typical prior art coupling is shown in cross-section in FIG. 1. The keys transfer torsion through shear at the midplane of the key, or at the interface between the shaft and the coupling. The machined, square key systems induce stress concentrations where abrupt changes in geometry occur, typically at the corners of the key. This corresponds to the root or base of the keyway machined in the shaft.

A composite shaft comprises layered material. The layers are concentric rings of reinforced material, typically as shown in cross-section in FIG. 2. A composite shaft has no reinforcement, however, in the radial direction. For this reason, a typical mode of failure for a layered composite is delamination between the axially-reinforced layers. Square, machined keys and keyways in a layered, composite propulsion shaft generate peak stresses at the root of the keyway, then immediately drop to zero toward the bore of the shaft and rapidly drop to zero as one moves toward the midplane of the key. The high stress gradient promotes premature interlaminar failure.

SUMMARY OF THE INVENTION

The present invention overcomes the problems noted above by optimizing the shape of a key and keyway machined in a composite shaft to provide a gradual reduction of bearing pressure, from a maximum at an outer portion of the shaft, to zero or near zero at a base of the keyway in the composite shaft.

Specifically, in accordance with the present invention, a key with a round shape is preferably provided, which significantly reduces the stress concentration at the base of the key, as compared to that of a standard "square" or "rectangular" machined keyway.

Cylindrical keys and keyways provide a simple and efficient way of mechanically coupling a composite propulsion shaft to hubs made of metal. Stress concentrations in the composite are reduced as compared to a rectangular keyway. The cylindrical keys have a variable bearing load on the machined composite keyway and will not promote delamination loads. The mechanical coupling can be easily machined, assembled and disassembled with standard procedures.

In the present invention, either the shaft, the hub or both can be composite material. Preferably, the hub is fabricated out of the same composite material as the shaftline, thereby minimizing stress concentrations due to material changes. Further, the keyways can be machined on a taper, which will result in both a frictional coupling and a keyed coupling. The combination of the two will provide load redundancy which is often utilized in current design practice.

The key and keyway of the present invention may also be elliptical. Further, an adhesive can be used to bond an interface of the coupling, for example, between the key and keyway or between the hub and the shaft. The combination will provide another load-handling redundancy in the coupling, thereby further increasing its capabilities.

The cylindrical keyway can be optimized for dissimilar materials and the geometries involved. In addition, the key itself can be optimized with respect to materials used and the geometries involved.

Other features and advantages of the present invention will become apparent from the following description of the invention which refers to the accompanying drawings.

DETAILED DESCRIPTION OF THE PREFERRED EMBODIMENTS

Figure 2:
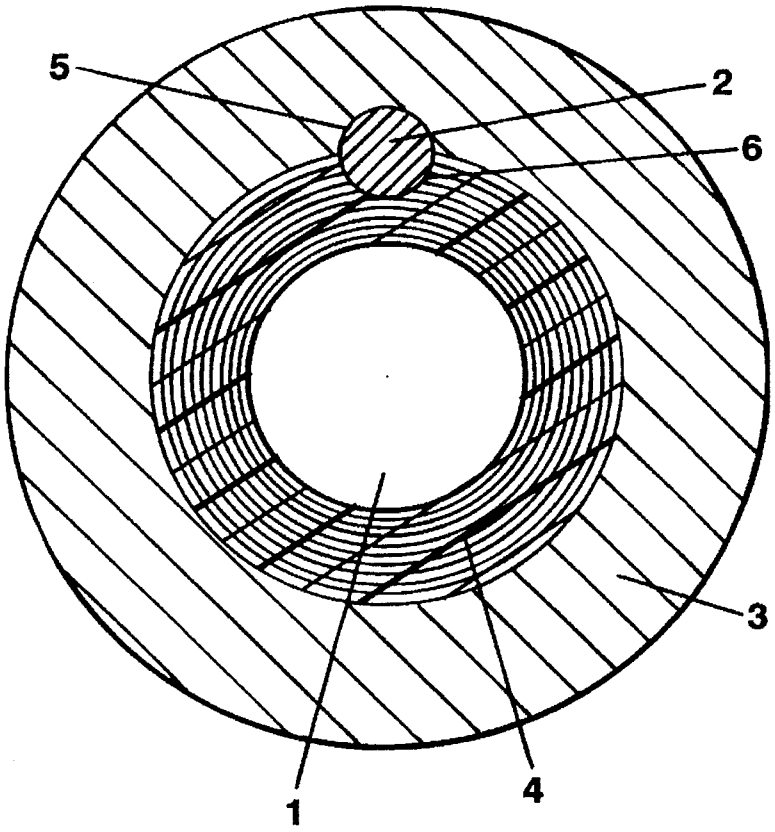
FIG. 2 PRIOR ART
FIG. 2 is a cross-sectional representation showing the coupling according to a first embodiment of the present invention.
Figure 5:
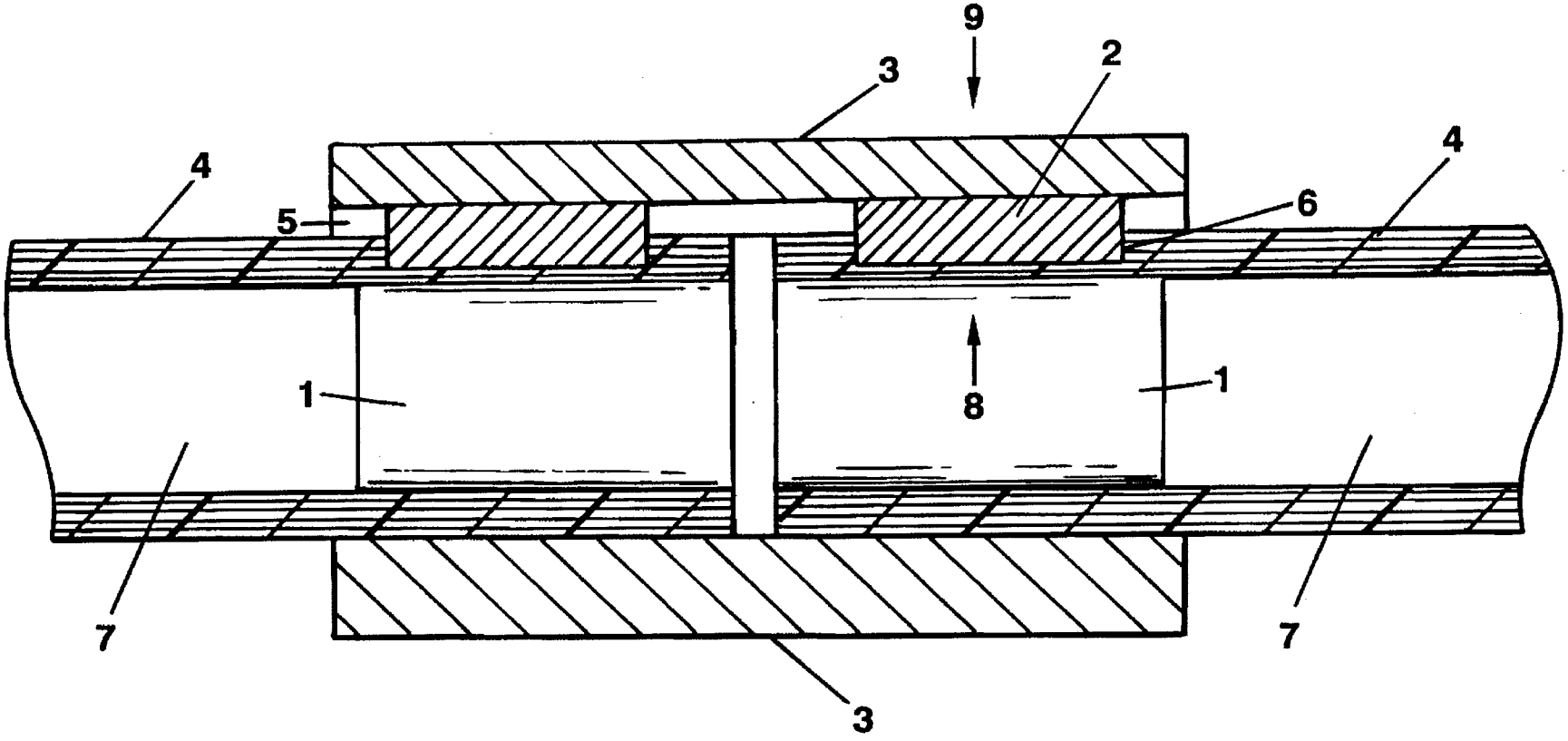
FIG. 5 is a side view showing two composite shafts coupled together according to the first embodiment of the present invention.

Referring to FIGS. 2 and 5, the key coupling according to a preferred embodiment of the present invention comprises four major components: a metal plug 1, a cylindrical key 2, a hub 3 and a composite shaft 4. A hub keyway 5 is formed in hub 3, and shaft keyways 6 are formed in shaft 4. The components are described more fully as follows:

1. Metal Plug in the Bore of the Composite Shaft

Figure 8:
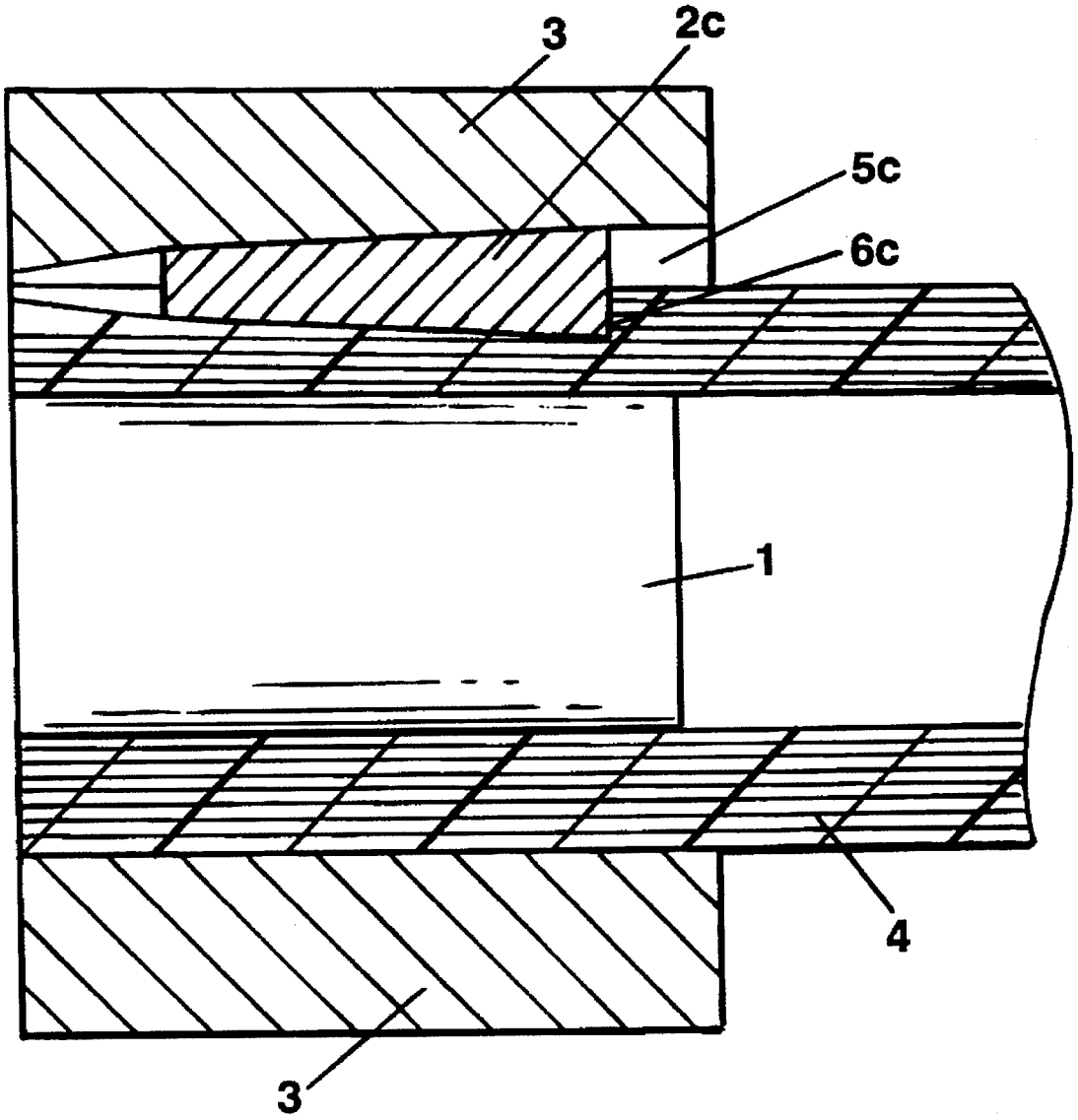
FIG. 8 is a detail view showing a tapered key and keyway according to an alternative embodiment of the present invention.

As shown in FIGS. 5 and 8, metal bore plug 1 is disposed inside bore 7 of hollow composite shaft 4 in substantially axial alignment with key 2. Metal plug 1 restricts radial deformation that may take place in composite shaft 4. When placed under a torsional load, cylindrical key 2 will tend to deform the composite shaft 4 radially. Bore plug 1 restricts this deforming motion.

2. Cylindrical Keys

Cylindrical key 2 is designed to match a maximum allowable bearing strength of the composite laminate used to form shaft 4. Any difference in stiffness between the composite shaft and the metal hub 3 induces a stress concentration. In order to reduce differences and stress, the key material is designed to be of some intermediate stiffness, thereby helping to control or moderate the stiffness differential between the "soft" or relatively low-modulus composite shaft and the "stiff" or relatively high-modulus metal hub If both materials are characterized by the same stiffness and geometry then the stress concentration due to dissimilar materials would reduce theoretically to zero.

3. Hub

Hub 3 is considered to be a relatively high modulus metal hub. As noted above, an optimized hub material is the same as that used in the composite shaft. This reduces stress concentrations due to a material change theoretically to zero. Remaining stress concentrations in the coupling are due to geometry changes.

Figure 1:
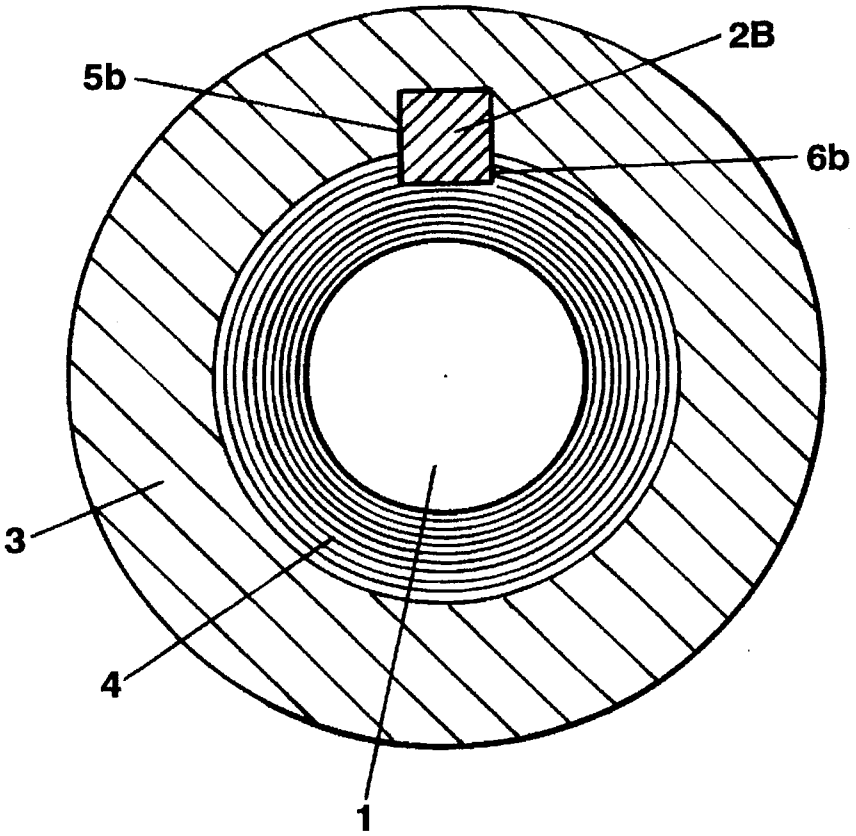
FIG. 1 is a cross-sectional representation of a prior art coupling using a square key and keyway.

As shown in FIGS. 5 and 8, keyways 5, **5*c* in hub 3 may be open-ended so that hub 3 may slide over keys 2, 2*c* and shaft 4 once keys 2, 2*c* are placed in keyways 6, 6*c* in shaft 4. As with the keyways 6 in the shaft, the cylindrical keyway 5 in metal hub 3 also improves stress concentration from conventional square keyways of the prior art as shown in FIG. 1. Square key 2*b* fits into a square keyway formed of hub keyway 5*b* and shaft keyway 6*b*. As stated above, the highest stress concentrations occur at the root of a square keyway, as shown at areas I and J in FIG. 3**, whereas lower bearing reactions that approach zero more gradually at the base of the keyway are associated with the cylindrical key coupling concept.

4. Composite shaft

Filament-wound composite propulsion shaft 4 has half-round cylindrical keyways 6 machined near the end. The keyways 6 are machined so as to capture keys 2 in closed-end slots.

Figure 4:
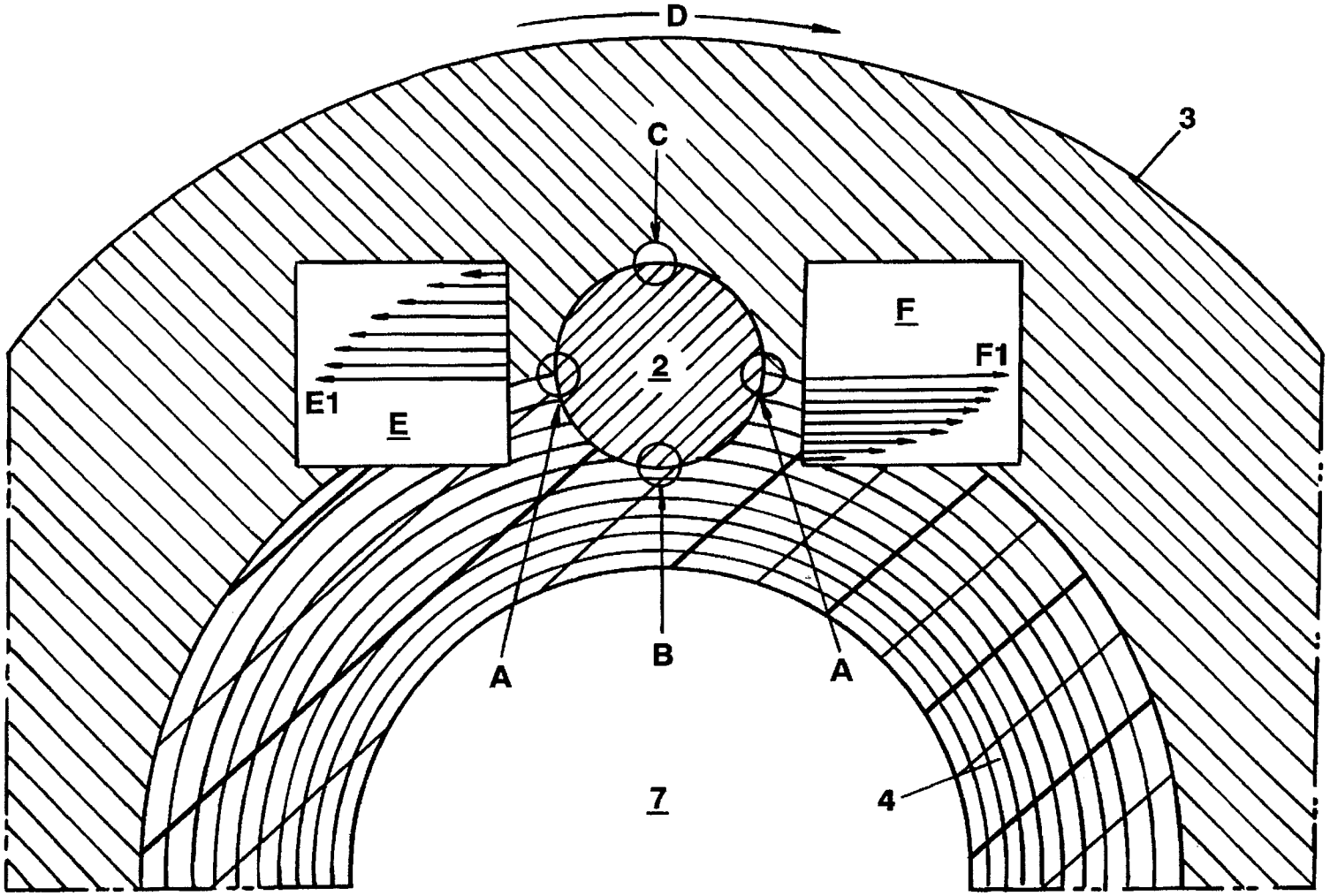
FIG. 4 is a partial cross section representing the coupling according to the first embodiment of the present invention showing pressure profiles and areas of stress concentration.

In operation, torque is transferred from the composite shaft 4 to the metal hub 3 via the bearing reaction of the cylindrical keys 2. As shown at areas E and F in FIG. 4, when a torsional force is applied in the direction indicated by arrow D, cylindrical key 2 exerts maximum bearing loads E1 and F1 at a midplane A of the key, which is coincident with a tangent to an outside diameter of the shaft 4. As shown by graphical arrows at areas E and F in the representation of FIG. 4, for a composite cylindrical keyway, the bearing load transfer is a maximum at the composite/metal interface A and gradually reduces to a minimum at the root or depth B and C of the keyway.

Figure 3:
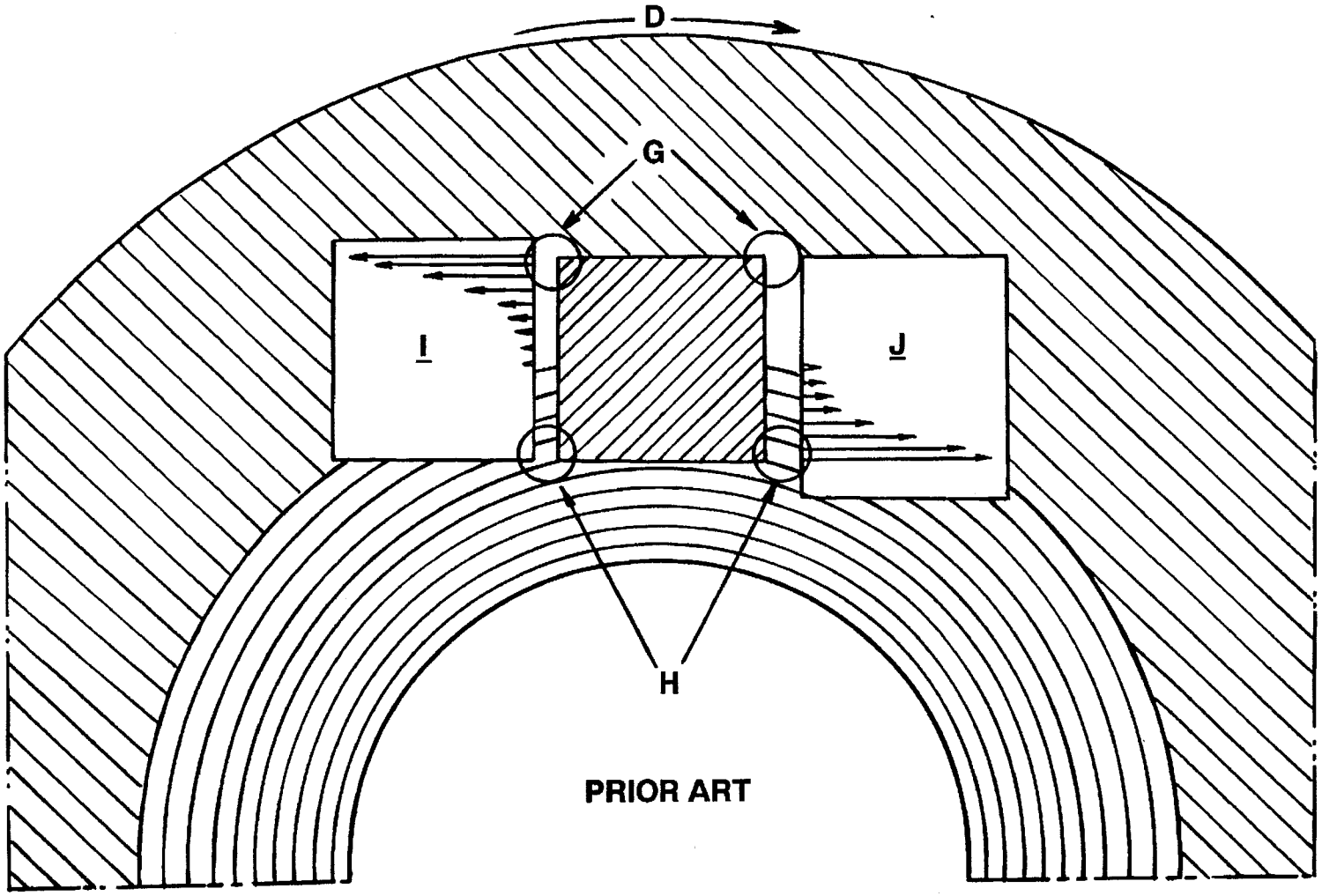
FIG. 3 is a partial cross section representing the prior art coupling showing pressure profiles and areas of stress concentration.

By comparison, with reference to areas I and J of FIG. 3, the bearing load transfer is maximized at the corners of the square key **2*b***. Stress is maximized in the hub at points G and in the shaft at points H.

Figure 6:
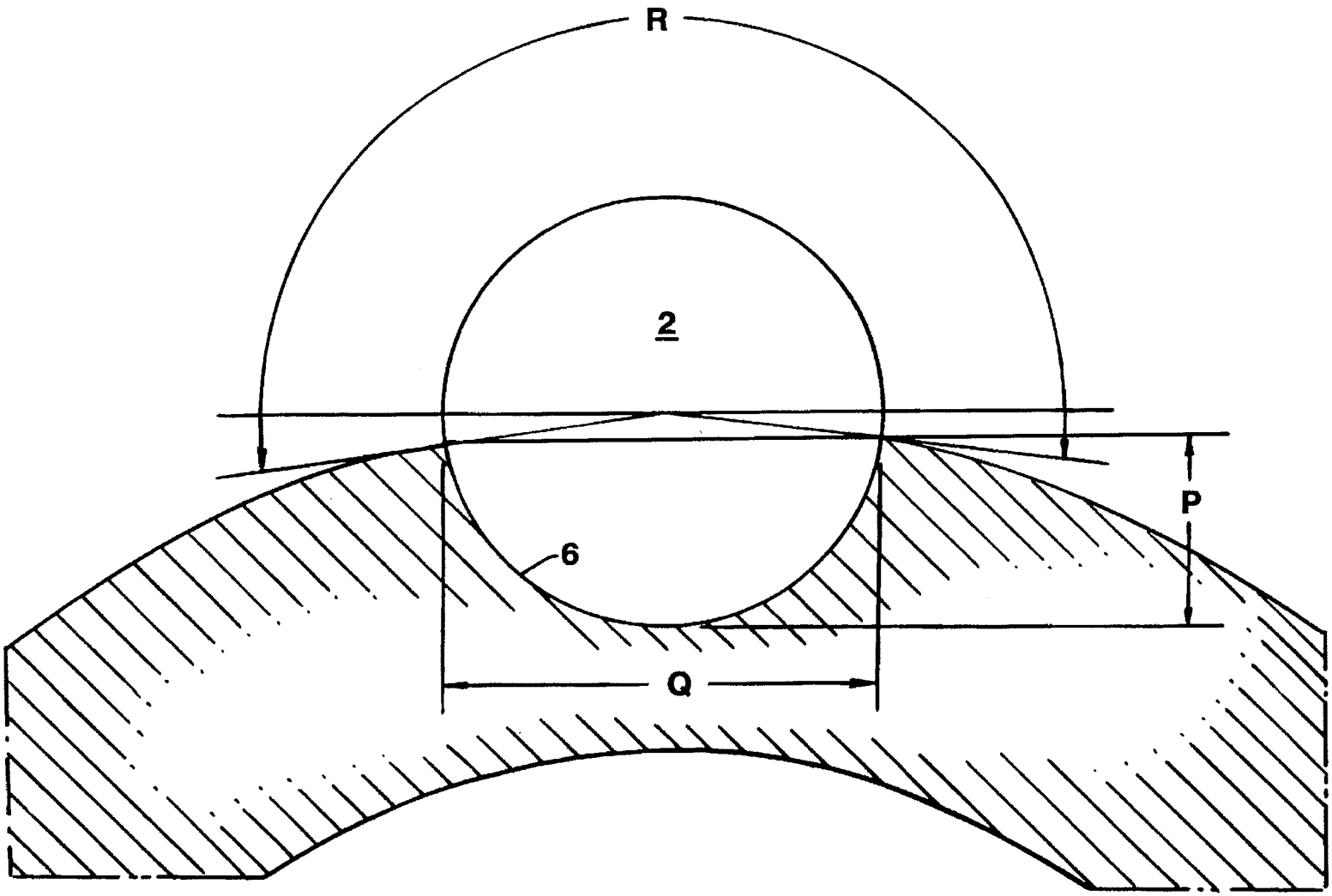
FIG. 6 is a partial cross section showing typical dimensions as the first embodiment of the present invention would be applied in a prototype propulsion system.

FIG. 6 represents the dimensional interface of the cylindrical key with the metal hub and composite shaft of a prototypical coupling. Test components were fabricated and an assembled coupling was tested for demonstration purposes.

A shaft diameter of 3,666" was fabricated. A key having a diameter of 0.75" was also formed. As can be seen with reference to FIG. 6, the shaft keyway 6 has an edge-to-base depth P of 0.324" and an edge-to-edge width Q of 0.743". An arc R representing the circumference of cylindrical key 2 outside shaft keyway 6 is 196 degrees. A hub key and keyway were formed accordingly.

A strain field was observed using a photoelastic coating on the outside diameter of the composite shaft adjacent to the cylindrical key. The strain field indicated a peak bearing pressure induced on the composite. For this demonstration, a maximum average bearing pressure based on a projected area was 40,000 psi. Past testing on this composite material indicated a maximum bearing strength of about 65,000 psi. The linear-loading curves that were generated were in a range of "maximum" composite shafting design practice.

The example provided substantial evidence of the viability of the cylindrical key concept. By loading cylindrical keys to an average bearing pressure of 40,000 p.s.i., or more than 60% of the composite substrate's maximum bearing strength, without inducing any indication of delamination, substantial evidence supporting low stress-concentration features of this mechanical coupling concept have been developed.

Figure 7:
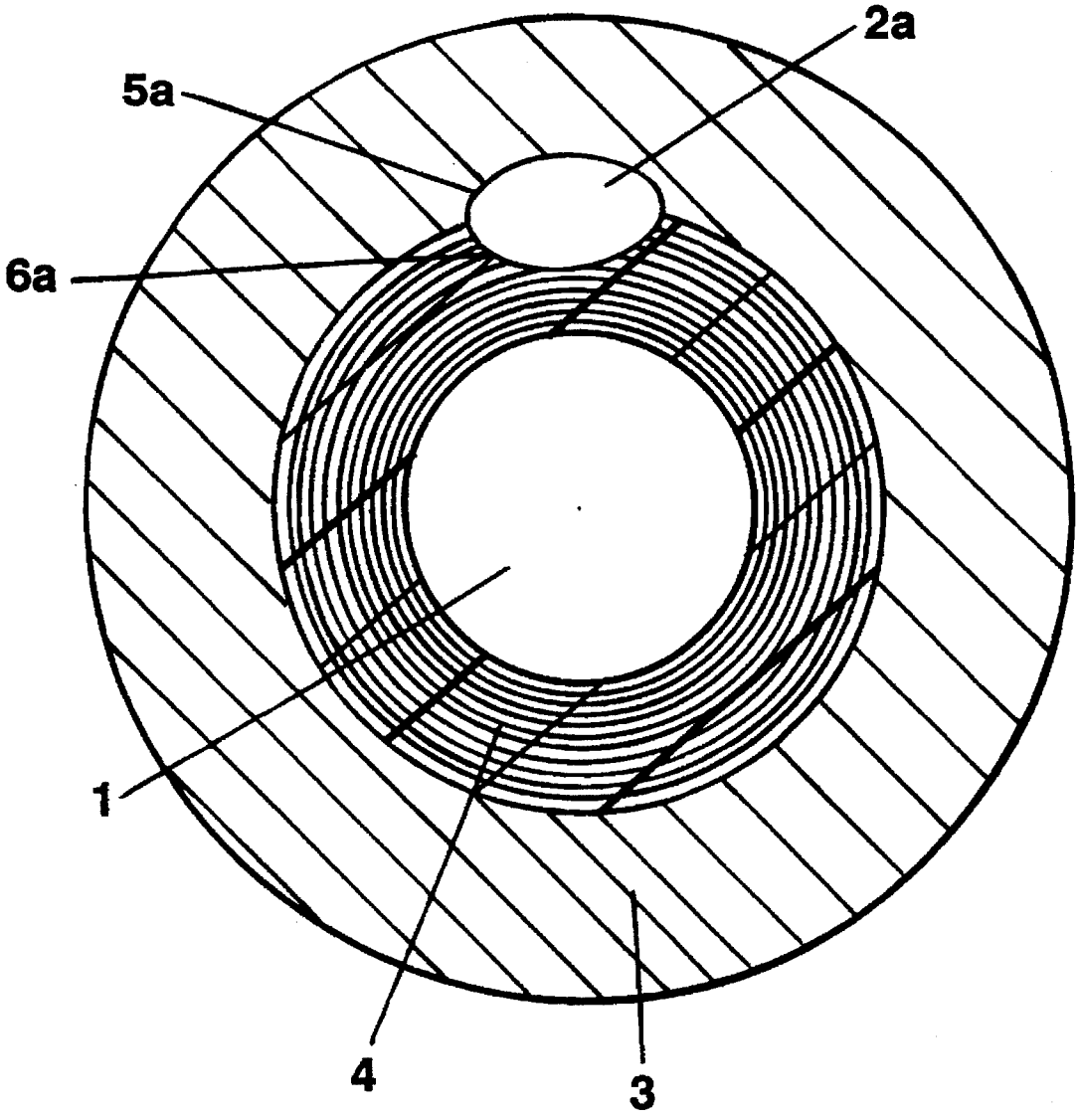
FIG. 7 is a cross section of a second embodiment of the present invention utilizing an elliptical key and keyway.

Referring to FIG. 7, an alternative embodiment incorporating an elliptical key 2*a* is shown. Hub keyway 5*a* and shaft keyway 6*a* are formed so as to form an ellipse upon alignment.

FIG. 8 shows a tapered key 2*c* and keyway 6*c* in yet another embodiment of the present invention. The tapered key provides frictional coupling in addition to the keyed coupling. The two combine for load redundancy as utilized in current design practice. The direction of the taper is chosen to conform with design requirements and constraints.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A coupling for a torsional drive, the coupling, comprising:

a rotatable hollow shaft made frown a shaft material and having therein an axial bore and further having an outer surface provided with a first keyway, said first keyway comprising a half-round groove;

a rotatable hub made of a hub material and disposed around said shaft and coaxial with said shaft, said hub having an inner surface provided with a second keyway, said second keyway comprising a half-round groove, said first keyway and said second keyway being alignable upon appropriate rotational alignment of said hub and said shaft to form a cylindrical keyway between said hub and said shaft;

a cylindrical key made of a key material and insertable into said cylindrical keyway between said shaft and said hub, to prevent relative rotation therebetween; and a bore plug made of a plug material and disposed in said axial bore substantially axially aligned with said cylindrical keyway for preventing radial deformation of said shaft by said key.

2. The coupling of claim 1, wherein said hub material and said plug material are metal.

3. The coupling of claim 2, wherein said shaft material is a fiber reinforced resin matrix composite material.

4. The coupling of claim 3, wherein said key material is selected so as to minimize a stiffness differential between said shaft and said hub.

5. The coupling of claim 4, wherein said key material has a stiffness that is intermediate between a stiffness of said shaft material and a stiffness of said hub material, so as to control the stiffness differential between said shaft and said hub.

6. The coupling of claim 1, wherein said cylindrical key and said cylindrical keyway are conically tapered.

7. The coupling of claim 1, wherein said first keyway has a keyway length measured in an axial direction of said shaft and said key has a key length measured in said axial direction and wherein said keyway length is substantially the same as said key length.

8. A coupling for a torsional drive, the coupling, comprising:

a rotatable hollow shaft having therein an axial bore and further having an outer surface provided with a first keyway, said first keyway comprising a half-elliptical groove;

a rotatable hub disposed around said shaft and coaxial therewith, said hub having an inner surface provided with a second keyway, said second keyway comprising a half-elliptical groove, said first keyway and said second keyway being alignable upon appropriate rotational alignment of said hub and said shaft to form an elliptical keyway between said hub and said shaft;

an elliptical key insertable into said elliptical keyway between said shaft and said hub, to prevent relative rotation therebetween; and a bore plug disposed in said axial bore substantially axially aligned with said elliptical keyway for preventing radial deformation of said shaft by said key.

9. A coupling for a torsional drive, the coupling, comprising:

a rotatable hollow shaft made of a composite material and having therein an axial bore and further having an outer surface provided with a first keyway, said first keyway comprising a half-round, closed-ended groove;

a rotatable hub made of said composite material and disposed around said shaft and coaxial therewith, said hub having an inner surface provided with a second keyway, said second keyway comprising a half-round, open-ended groove, said first keyway and said second keyway being alignable upon appropriate rotational alignment of said hub and said shaft to form a cylindrical keyway between said hub and said shaft;

a cylindrical key made of metal and insertable into said cylindrical keyway between said shaft and said hub, to prevent relative rotation therebetween; and a bore plug made of metal and disposed in said axial bore substantially axially aligned with said cylindrical keyway for preventing radial deformation of said shaft by said key.

* * * * *